INVENTOR
ROBERT M. STANLEY

BY
Strauch, Nolan, Neale, Nies & Kurz
ATTORNEY

INVENTOR
ROBERT M. STANLEY

BY
Strauch, Nolan, Neale, Nies & Kurz
ATTORNEYS

March 24, 1970 R. M. STANLEY 3,502,073

LIMB RESTRAINT APPARATUS

Filed June 20, 1967 11 Sheets-Sheet 3

INVENTOR

ROBERT M. STANLEY

BY

Strauch, Nolan, Neale, Nies & Kurz

ATTORNEYS

INVENTOR
ROBERT M. STANLEY

BY
Strauch, Nolan, Neale, Nies & Kurz
ATTORNEYS

March 24, 1970 R. M. STANLEY 3,502,073

LIMB RESTRAINT APPARATUS

Filed June 20, 1967 11 Sheets-Sheet 5

INVENTOR

ROBERT M. STANLEY

BY

Strauch Nolan Neale Nies & Kurz

ATTORNEYS

INVENTOR
ROBERT M. STANLEY

BY
*Strauch Nolan Neale Nies + Kurz*
ATTORNEYS

LIMB RESTRAINT APPARATUS

Filed June 20, 1967

INVENTOR

ROBERT M. STANLEY

BY

Strauch Nolan Neale Nies & Kurz

ATTORNEYS

INVENTOR
ROBERT M. STANLEY

BY Strauch Nolan Neale Nies & Kurz
ATTORNEYS

March 24, 1970 R. M. STANLEY 3,502,073

LIMB RESTRAINT APPARATUS

Filed June 20, 1967 11 Sheets-Sheet 9

INVENTOR

ROBERT M. STANLEY

BY Strauch Nolan Neale Nies & Kurz

ATTORNEYS

March 24, 1970 R. M. STANLEY 3,502,073

LIMB RESTRAINT APPARATUS

Filed June 20, 1967 11 Sheets-Sheet 10

INVENTOR

ROBERT M. STANLEY

BY

Strauch Nolan Neale Nies & Kurz

ATTORNEYS

INVENTOR

ROBERT M. STANLEY

BY

Strauch Nolan Neale Nies & Kurz

ATTORNEYS

United States Patent Office 3,502,073
Patented Mar. 24, 1970

3,502,073

LIMB RESTRAINT APPARATUS

Robert M. Stanley, Denver, Colo., assignor to Stanley Aviation Corporation, Aurora, Colo., a corporation of New York Filed June 20, 1967, Ser. No. 647,417
Int. Cl. A61f *13/00, 5/37*
U.S. Cl. 128—134 15 Claims

ABSTRACT OF THE DISCLOSURE

The apparatus disclosed herein for restraining the limbs of a man escaping from a vehicle comprises a garment worn by the man and slack cords which are carried on the garment and which are connected either to a prime mover or a fixed part in the vehicle in such a manner that their effective lengths are shortened to forcibly draw and tightly bind the man's limbs together as he is ejected or extracted from the vehicle by operation of his escape equipment.

FIELD OF INVENTION

This invention relates to equipment for restraining a man's limbs and is particularly adapted for use in preventing a crewman's limbs from flailing when he is subjected to high velocity windblast during his escape from an air of space vehicle.

OBJECTS AND SUMMARY OF INVENTION

The present invention contemplates and has as its primary object a novel and simplified means which is carried on a garment worn by the man for restraining his limbs against uncontrolled, injury-producing movement. Since the limb restraint equipment is carried by the man's garment it may be used in conjunction with a wide variety of power operated escape systems including those in which the man's seat remains in the aircraft.

The foregoing object is accomplished by providing a garment which is worn by the man and which carries one or more slack cords. In one embodiment, the cords are connected through a snubber to a fixed part in the aircraft. These cords extend along the garment to the man's wrists and shins or ankles in such a manner that when they are effectively tensioned and shortened by movement of the man out of the vehicle and away from the fixed part, the man's wrists and legs are forcibly drawn and tightly bound together. The snubber is operative to anchor the cords in their tensioned, limb restraining positions after the cord connection to the fixed part in the vehicle fails. After a suitable time delay following his escape from the vehicle, the cords are automatically severed to free the man's limbs for making a safe parachute descent and landing. Alternatively, the cords may be connected to a form of take-up reel carried on the restraint garment and being operative to rapidly shorten the effective cord length as the man is removed from the vehicle by actuation of his escape equipment.

Accordingly, a more specific object of this invention is to provide a novel limb restraining apparatus comprising a garment worn by the man and slack cords extending along the garment and adapted to be connected through a snubber to a part of the aircraft such that the cord length extending along the garment is effectively shortened to draw and bind his legs and/or wrists closely together as he is forced out of the vehicle, whereby uncontrolled, injury-producing movement of the man's limbs is minimized.

Another object is to provide a prime mover carried on the man's garment to pay in the cords as the man is forcibly removed from the vehicle.

A further object of this invention is to provide a novel limb restraint means which is simple in construction, which is inexpensive to manufacture, which is incorporated into a garment that can be easily put on and shed by the wearer, and which does not impair the man's movements prior to use.

Further objects of this invention will appear as the description proceeds in connection with the annexed claims and appended drawings wherein:

Figure 1:
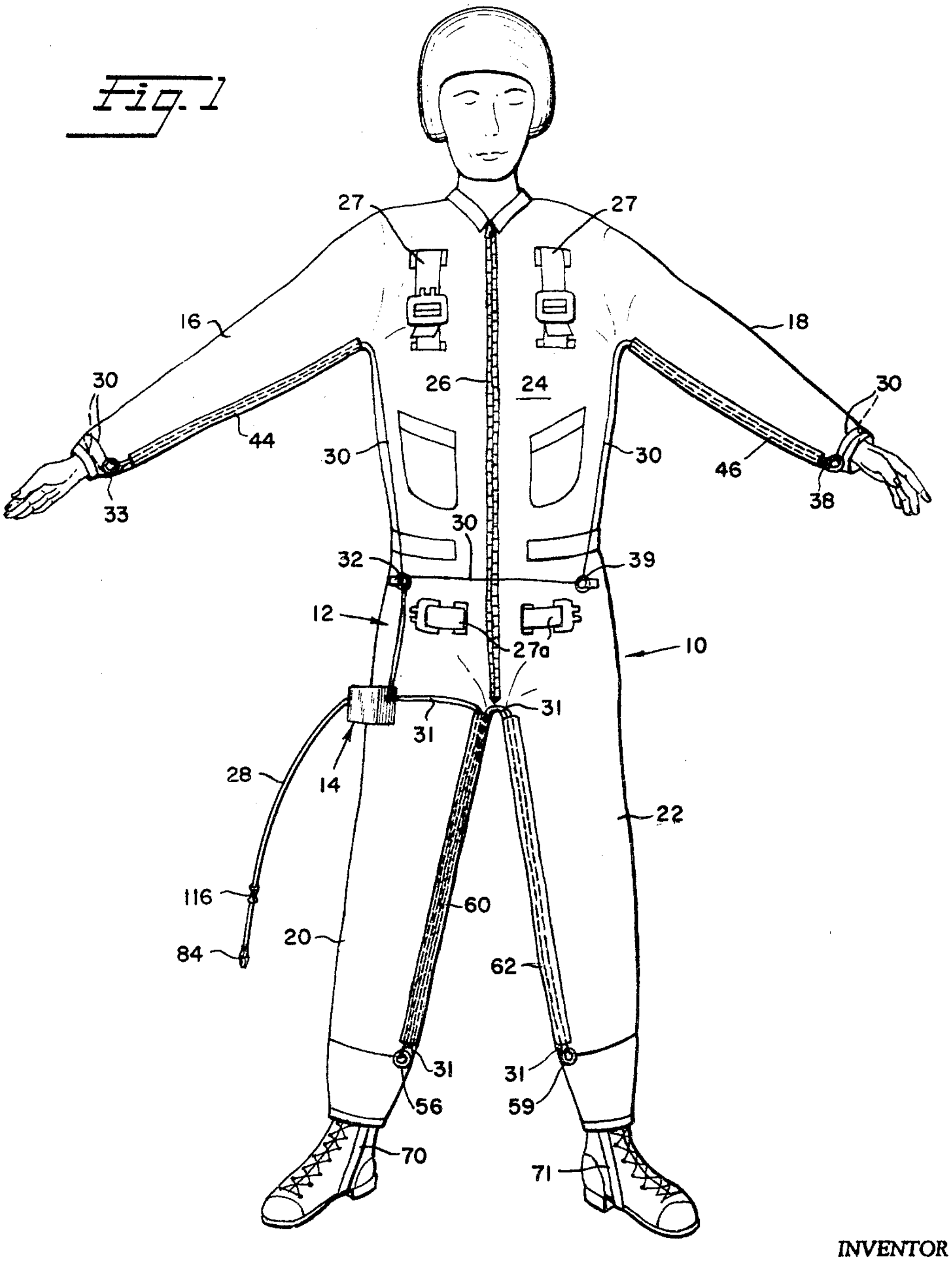
FIGURE 1 is a front view of a man wearing the preferred form of limb restraint garment and equipment of this invention and showing the garment with limbs spread and unrestrained.
Figure 2:
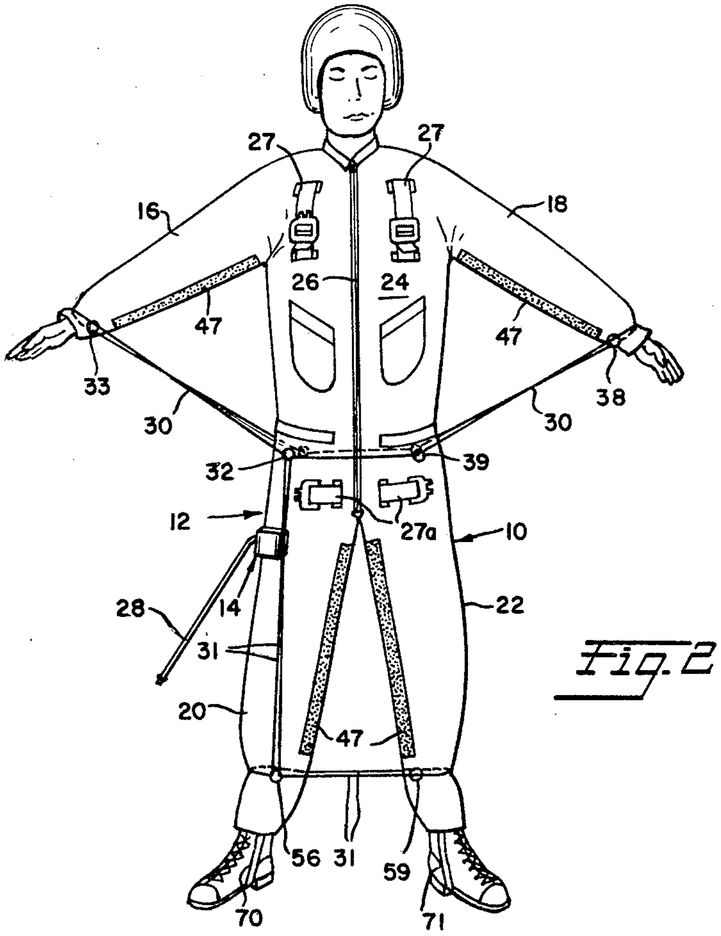
FIGURE 2 is a front view similar to FIGURE 1, but showing an intermediate, tensioned position of the limb restraint cords.
Figure 5:
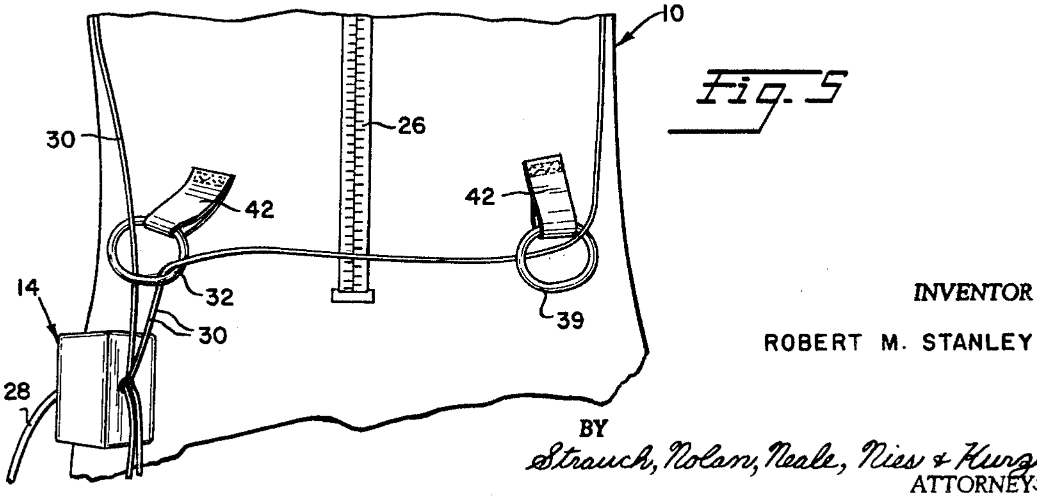
Figures 3, 6:
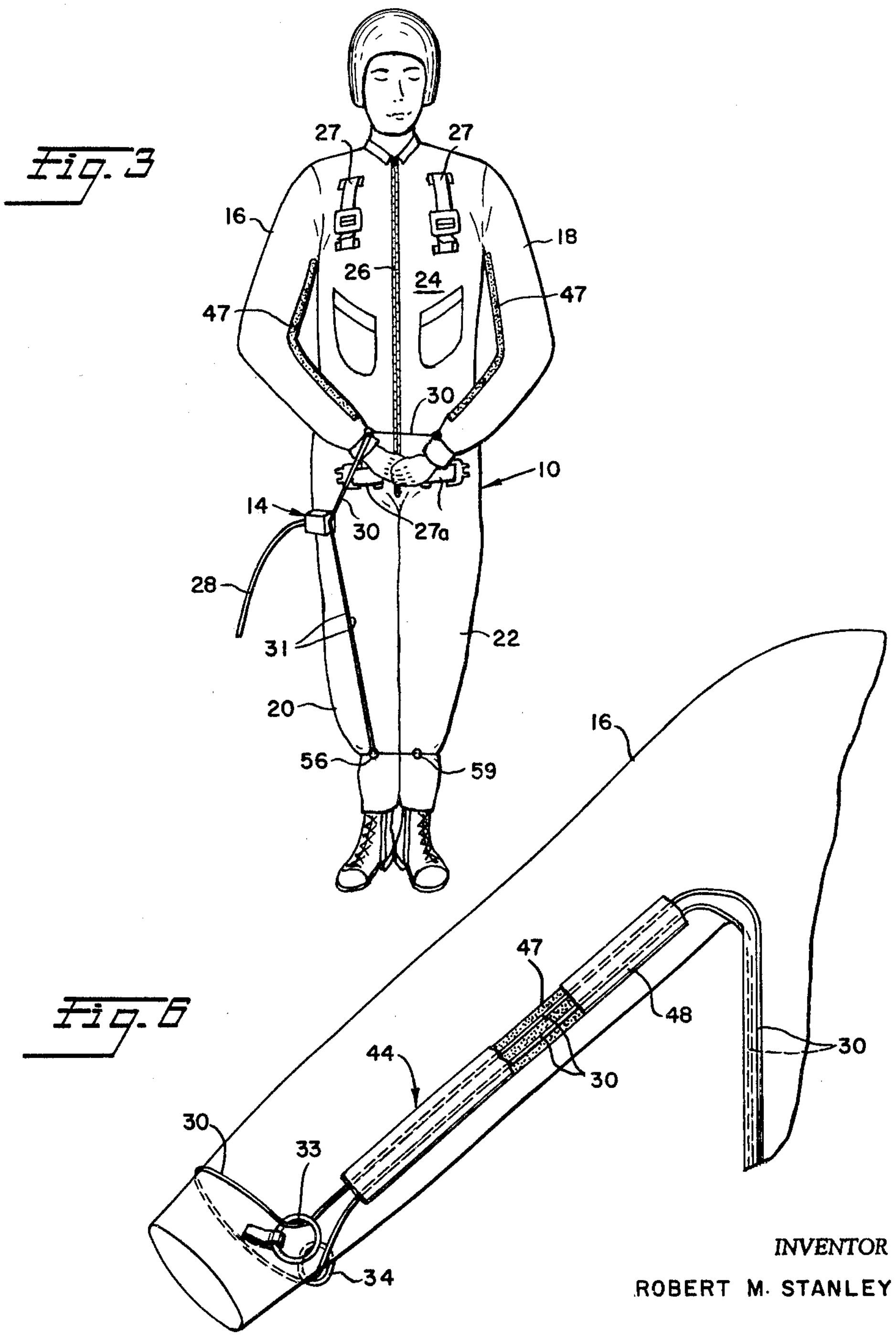
Figure 4:
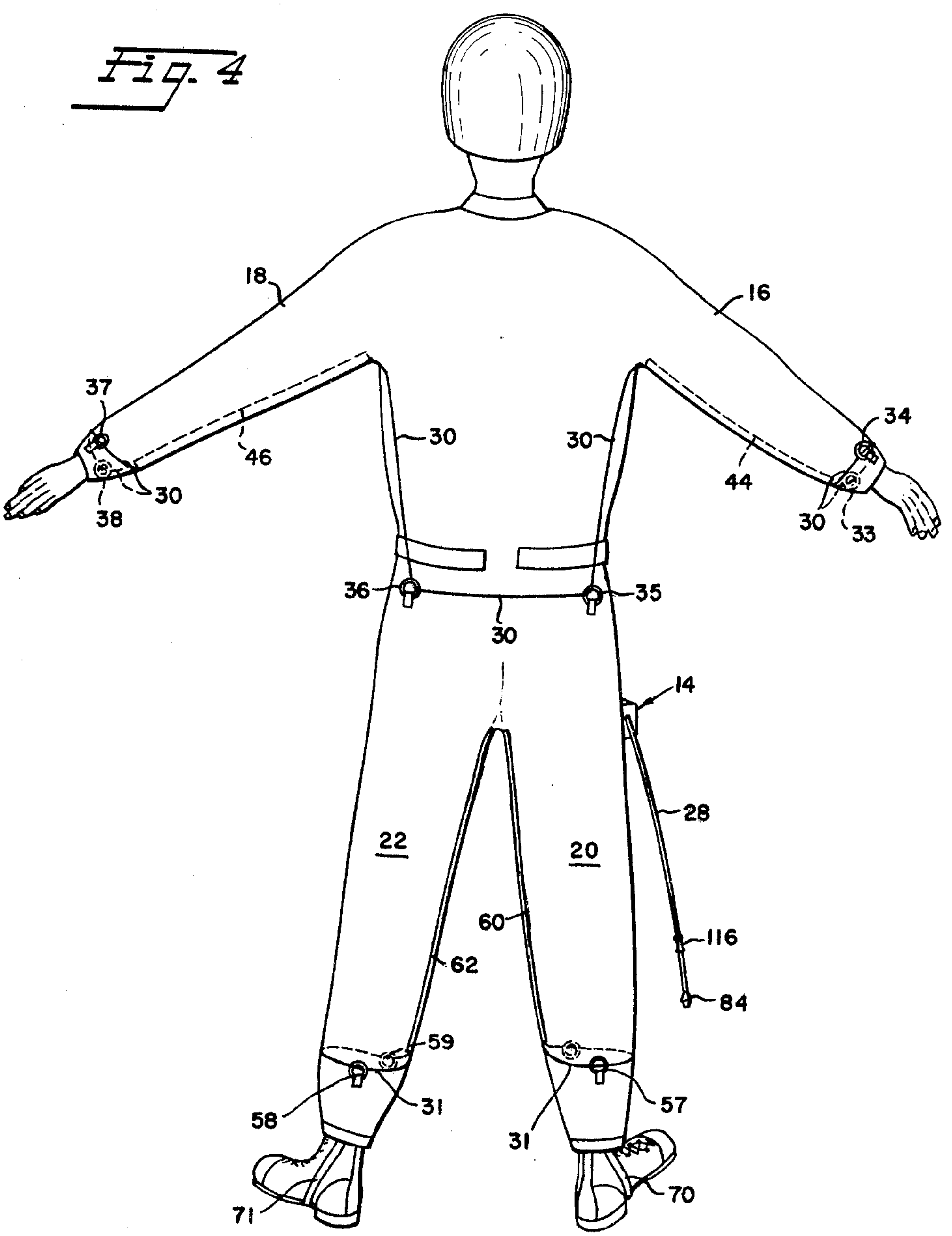
Figures 7, 11, 12:
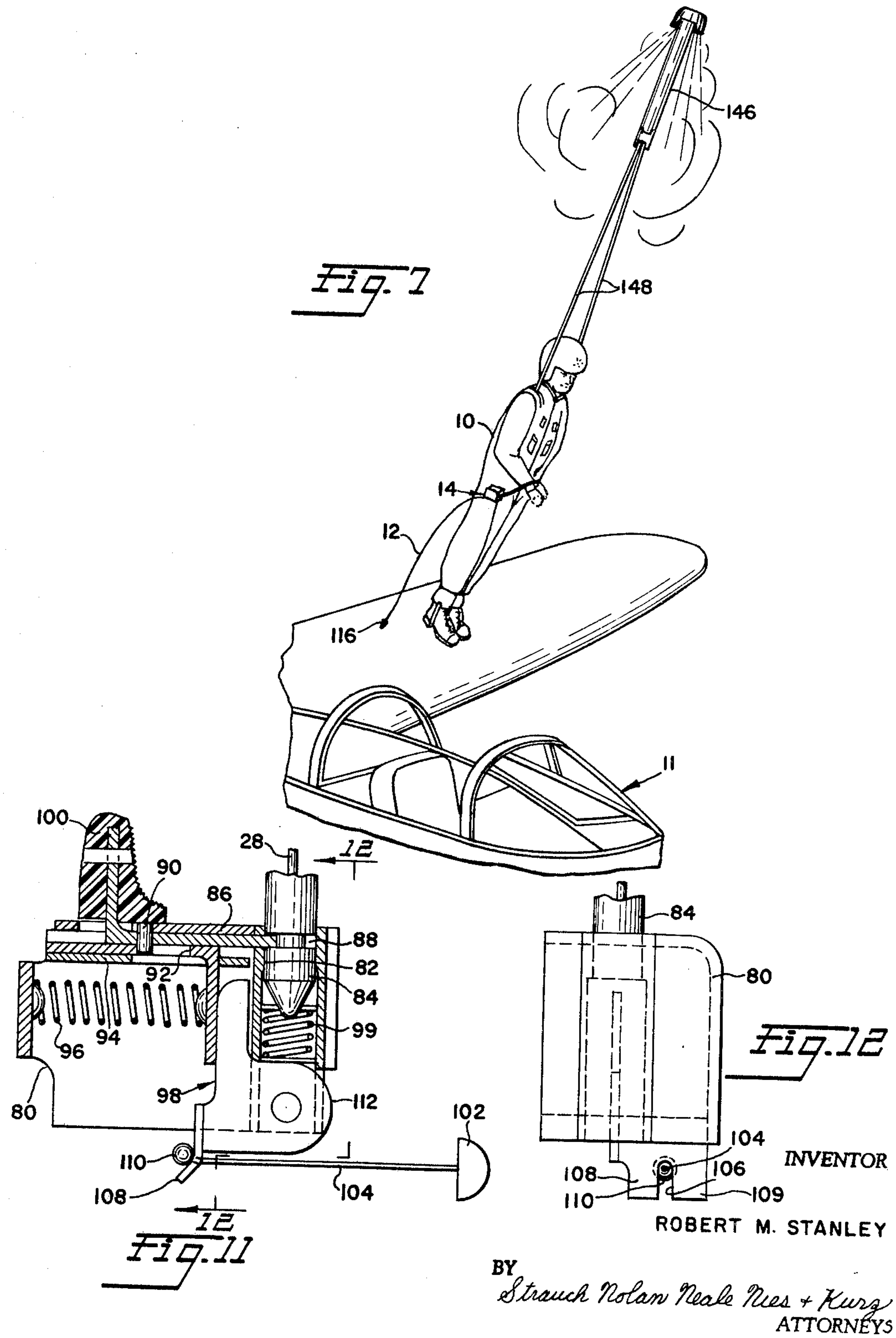
Figure 8:
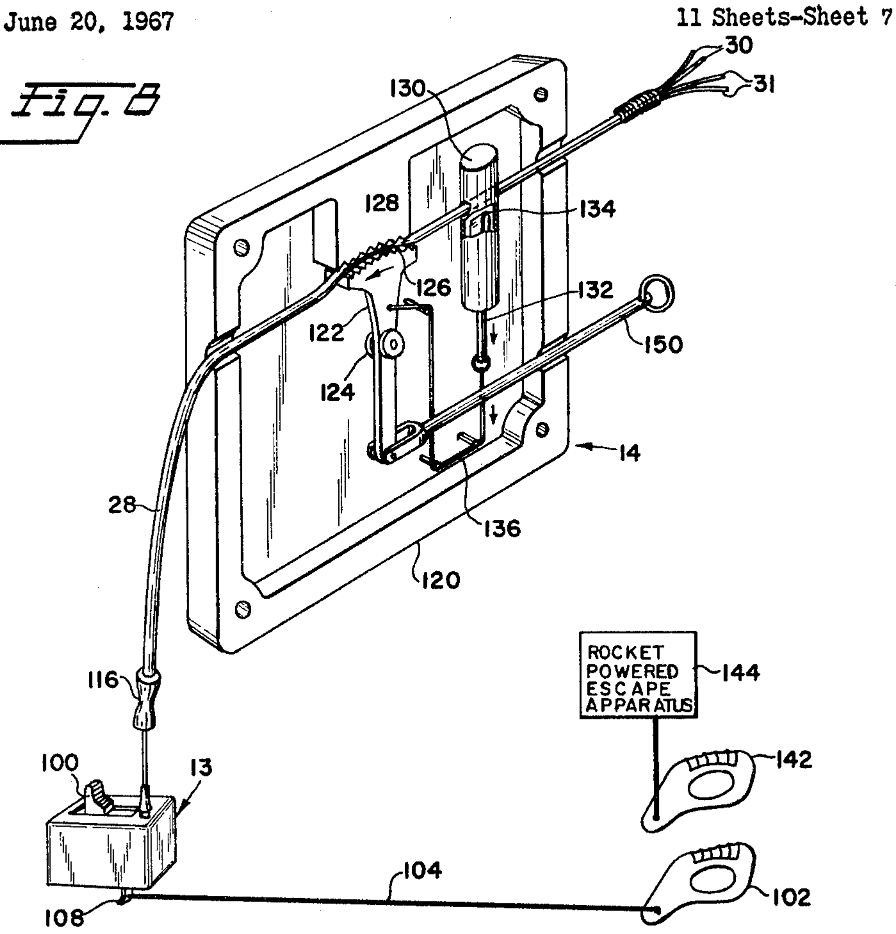
Figure 8A:
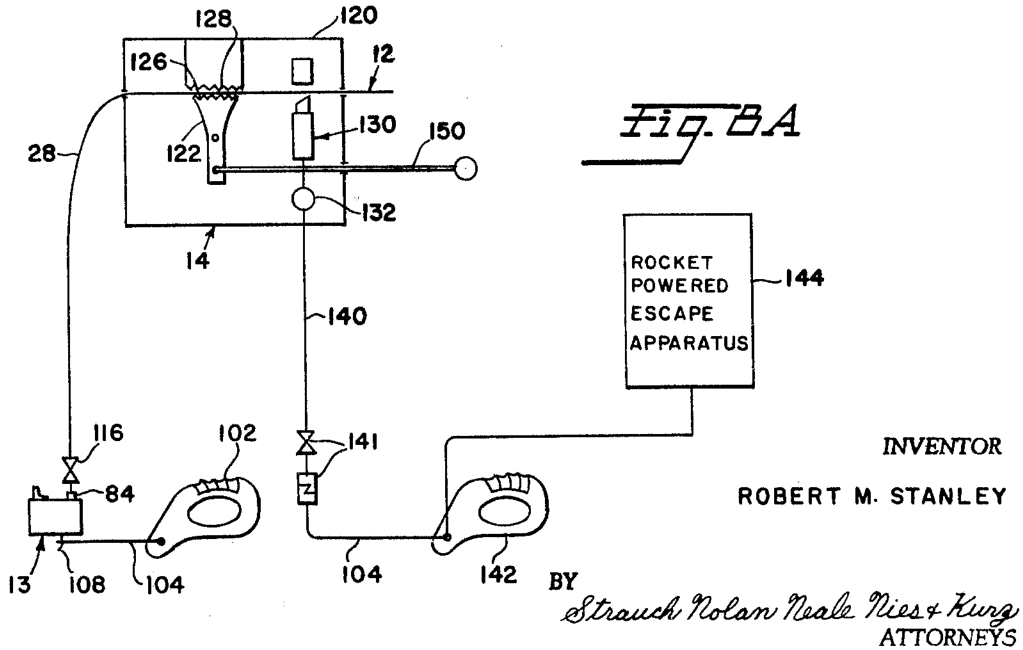
Figures 9, 10:
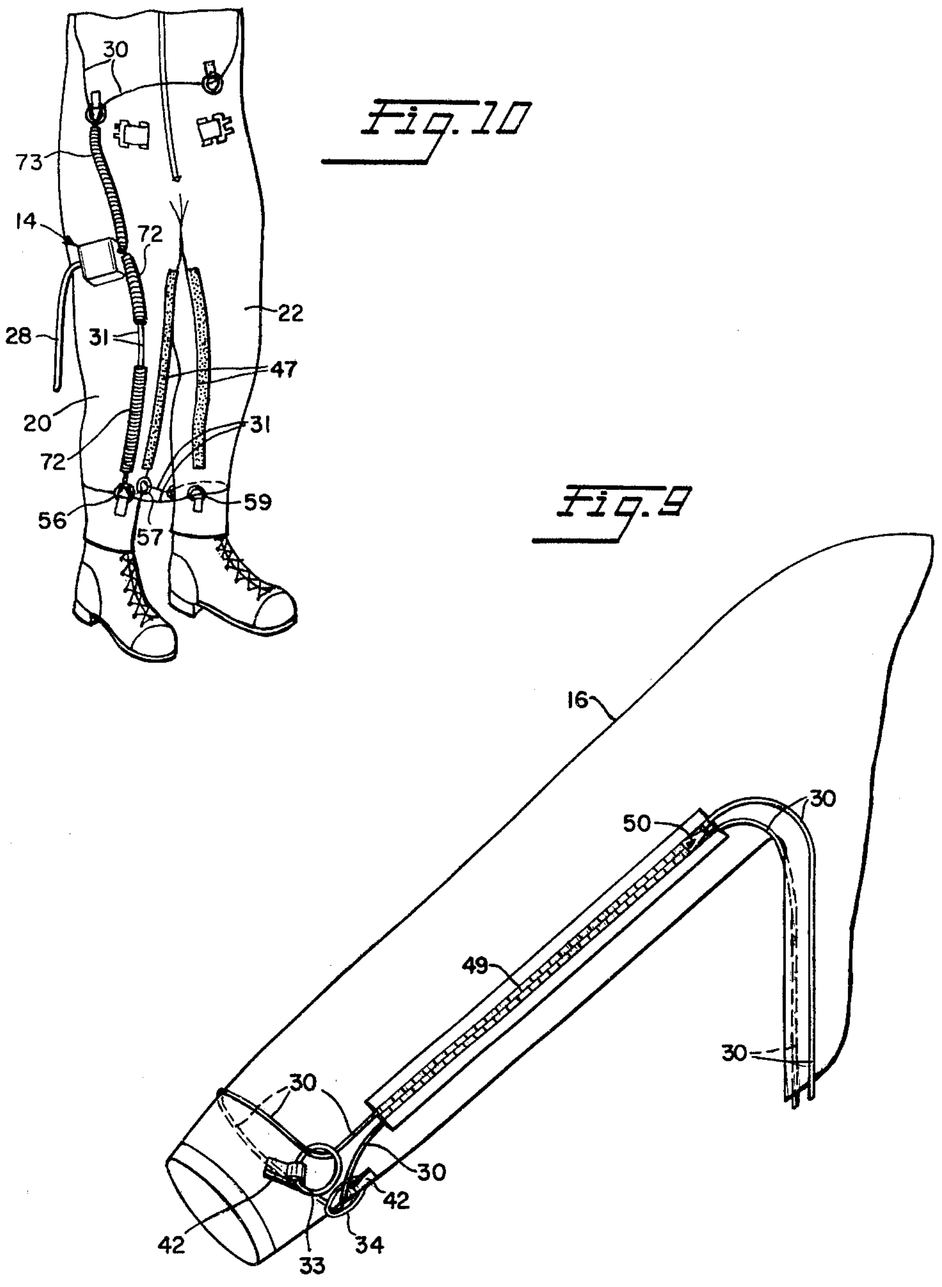
Figure 13:
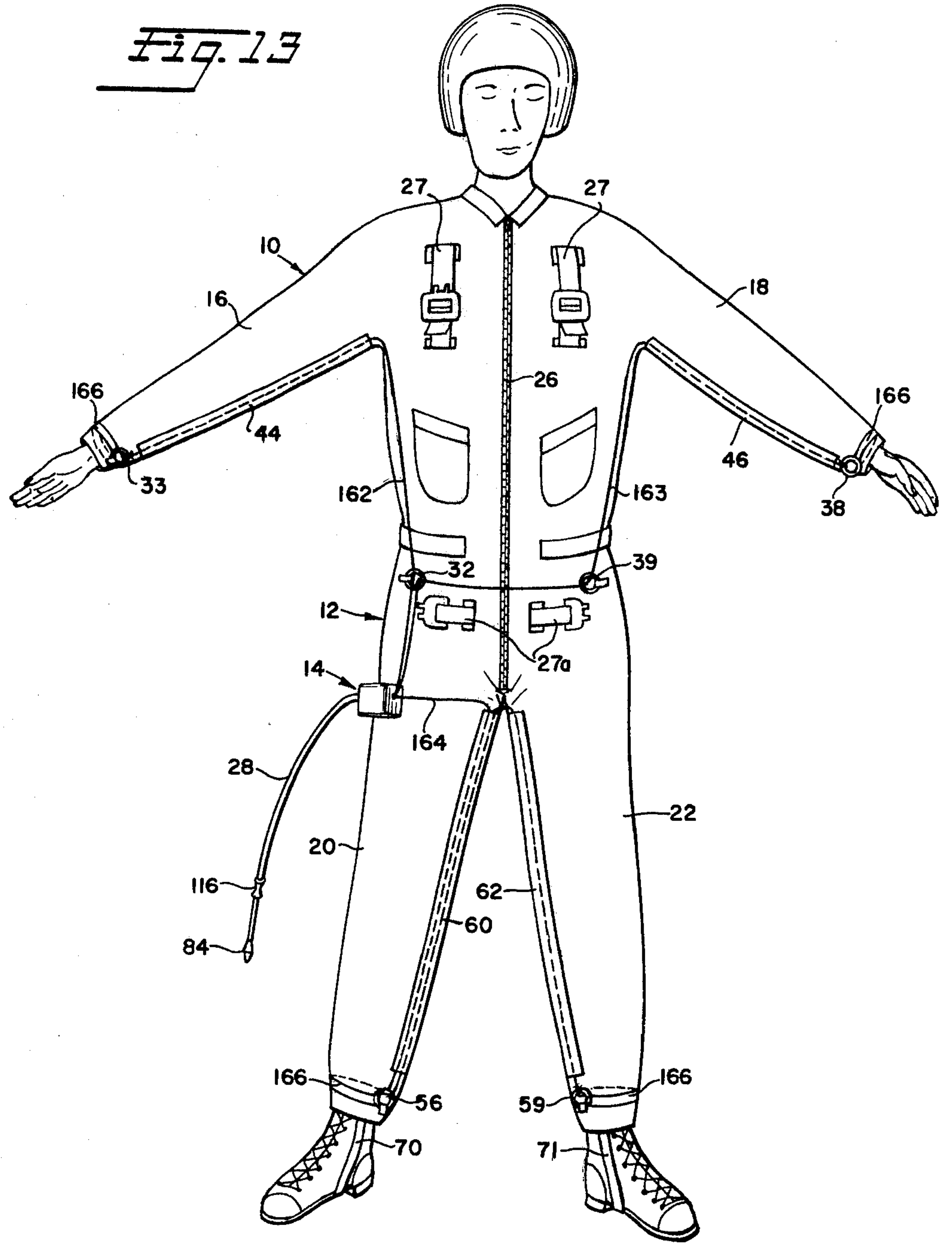
Figure 14:
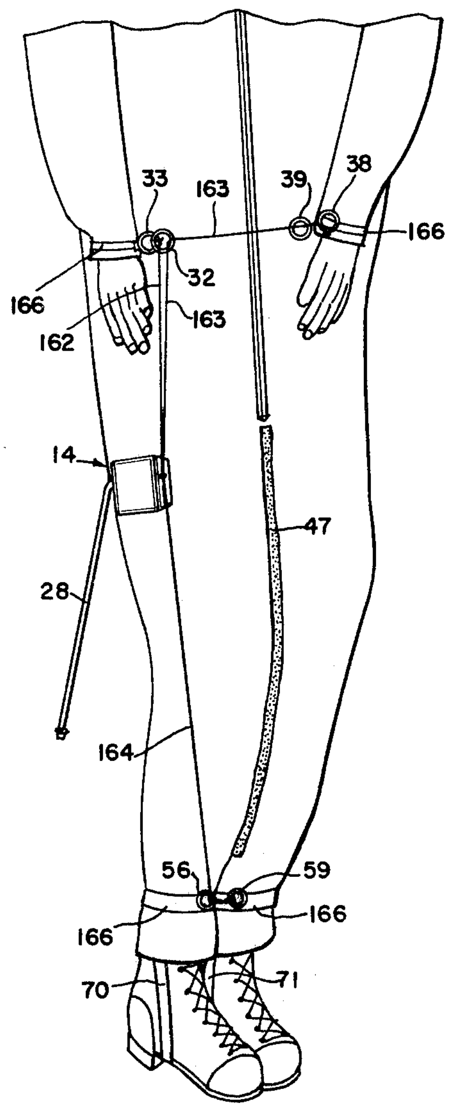
Figure 15:
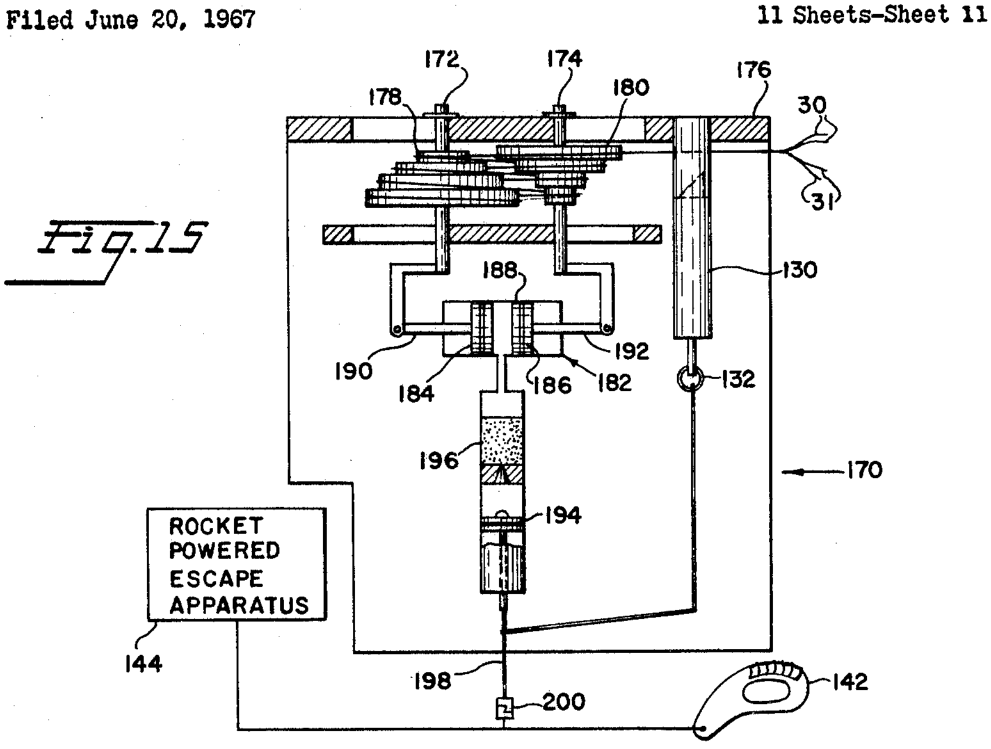
Figure 16:
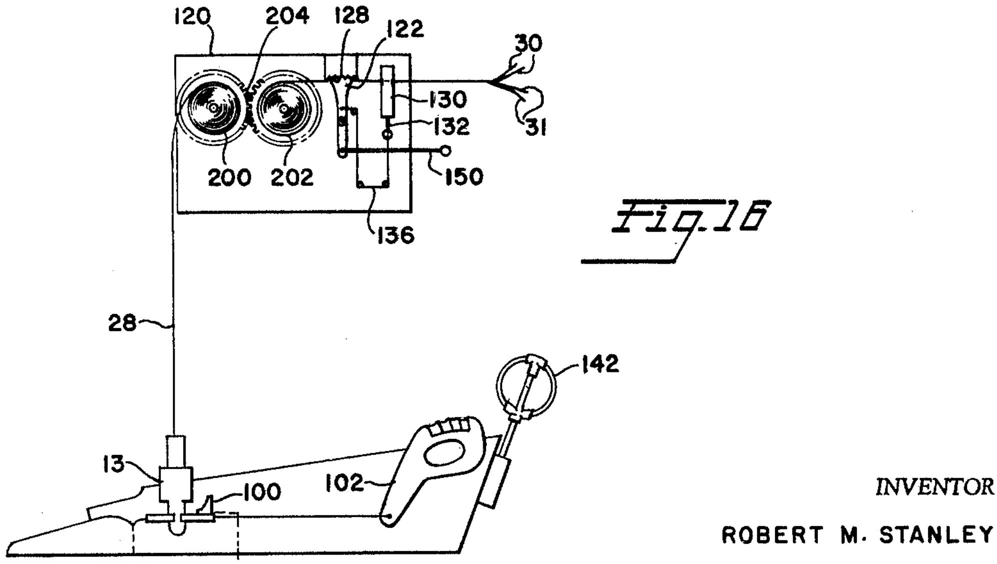

FIGURE 3 also is a front view which shows the final position of the garment and cords with the man's wrists and legs restrained;

FIGURE 4 is a rear view of the man and the restraint garment shown in FIGURE 1;

FIGURE 5 is an enlarged fragmentary front view of the restraint garment in the region of the man's waist;

FIGURE 6 is an enlarged fragmentary view of the right-hand sleeve of the restraint garment shown in FIGURE 1;

FIGURE 7 is a perspective fragmentary view showing the man with his limbs lashed together as he leaves the aircraft;

FIGURE 8 is a schematic view of the limb restraint and escape apparatus control system;

FIGURE 8A is a schematic view illustrating a modified arrangement for arming the reefing line cutter shown in FIGURE 8;

FIGURE 9 is a view similar to FIGURE 6, but showing an alternate form of cord-confining sheath;

FIGURE 10 is a fragmentary view of the garment trouser legs showing the leg restraint cord in its position of FIGURE 2 and an alternate construction which keeps the trouser legs from riding up when the leg restraint cords are payed in;

FIGURE 11 is a longitudinal section showing details of the dissconnect assembly illustrated in FIGURE 8;

FIGURE 12 is a section taken substantially along lines 12—12 of FIGURE 11;

FIGURE 13 is similar to FIGURE 1 and illustrates a modified arrangement of restraint cords for lashing the man's arms and legs together;

FIGURE 14 illustrates the man's arms and legs lashed together with the arrangement shown in FIGURE 13;

FIGURE 15 schematically illustrates a modified embodiment wherein the limb restraint cords are payed in by a ballistically operated windlass; and FIGURE 16 illustrates a modified form of the snubber.

Referring now to the drawings and more particularly to FIGURES 1, 7 and 8, the limb restraining means of this invention is shown to comprise a garment 10 adapted to be worn by a crewman or other occupant of an aircraft 11 (see FIGURE 7), a limb restraint cord assembly 12, a disconnect assembly 13 (see FIGURE 8) for anchoring cord assembly 12 to a part in the aircraft so that when the man is ejected or extracted from aircraft 11 the effective length of cord assembly 12 on garment 10 is shortened to lash the man's limbs together, and a snubber 14 retaining cord assembly 12 tensioned to keep the man's limbs lashed together upon separation of the man from the aircraft.

Garment 10 may be of any suitable form such as a flight coverall modified to incorporate the present invention. The garment is shown to have the usual full-length sleeves 16 and 18, trouser legs 20 and 22, and a torso section 24. A vertical zipper 26 extending from the neck to the crotch in the front of section 24 enables the man to quickly put on and remove the garment in a conventional manner. Preferably, garment 10 is constructed to incorporate the man's torso harness 27 and his lap restraint belt connections indicated at 27*a*. Snubber 14 is suitably secured to garment 10 and will be described in detail later on.

Figure 1A:
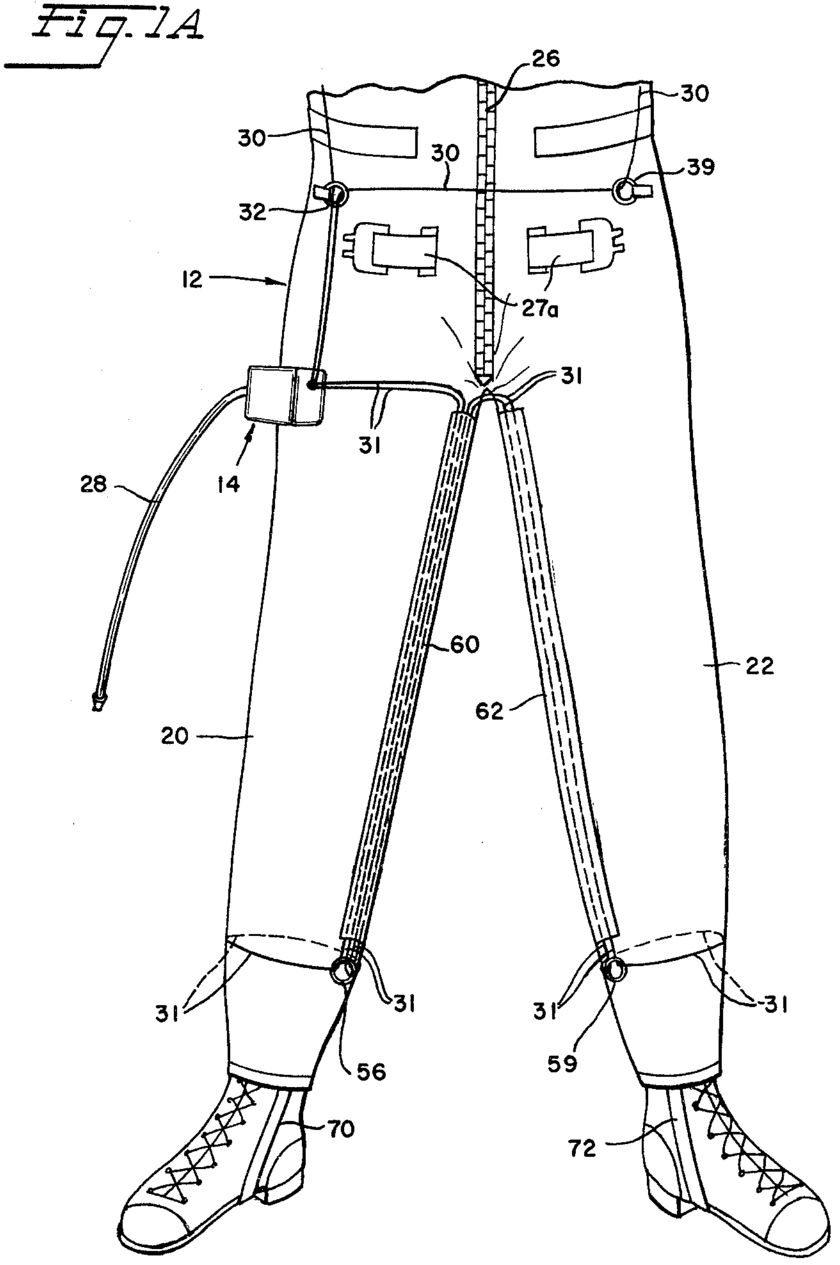
FIGURE 1A is a fragmentary view showing more clearly the parts for restraining the man's legs.

As best shown in FIGURES 1A and 8, cord assembly 12 comprises a motion transmitting cord 28, an arm restraint cord 30 and a leg restraint cord 31. Cord 28, as best shown in FIGURE 8, is releasably connected to disconnect assembly 13 and extends through snubber 14. Both ends of each of the restraint cords 30 and 31 are spliced or otherwise suitably secured to cord 28.

Cord 30, as shown in FIGURES 1 and 4, is guided for movement along garment 10 by a series of guide rings 32, 33, 34, 35, 36, 37, 38, and 39. Each of the guide rings 32–39 is secured to garment 10 by any suitable means such as, for example, a tough flexible strip of fabric 42 (see FIGURE 5) which is looped through each guide ring and sewn or otherwise suitably secured at both ends to garment 10.

Guide ring 32 is located just above snubber 14 in the region of the man's waist. Ring 33 (FIGURE 1) and ring 34 (FIGURE 4) are secured to garment 10 near the end of sleeve 16 and are respectively located at the inside and backside of the man's right wrist. Rings 35 and 36 (see FIGURE 4) are spaced along the man's backside in the region of his waist, with ring 35 being disposed to the man's right and ring 36 being disposed to his left. Ring 37 (FIGURE 4) and ring 38 (FIGURE 1) are secured to garment 10 near the end of sleeve 18 and, similar to rings 33 and 34, are respectively located at the backside and inside of the man's left wrist. Ring 39 is disposed on the man's left side in the region of his waist.

As shown in FIGURE 1, cord 30 extends upwardly from snubber 14 preferably along the side axis of the man's righthand hip and passes through guide ring 32. From ring 32, cord 30 extends upwardly along the right side of his torso on the outside of garment 10 to the region of the man's right-hand armpit.

From the right-hand armpit, cord 30 extends down through an opened-ended sheath 44 on sleeve 16, through guide ring 33, around the outside of the man's right wrist, through guide ring 34, and back up through sheath 44 to the man's right-hand armpit. From here, cord 30 extends down along the right-hand side of the man's torso, through guide ring 35, across the man's backside in the region of his waist, through guide 36, and up along the left-hand side of the man's torso to his left-hand armpit.

From the left-hand armpit, cord 30 extends down through a further open-ended sheath 46 on sleeve 18, through guide ring 37, around the outside of the man's left wrist, through guide ring 38, and back up through sheath 46 to his left-hand armpit. Cord 30 then extends down along the left-hand side of the man's torso, through guide ring 39, across his belly, and down through guide ring 32 to its connection to cord 28 at snubber 14.

As best shown in FIGURE 6, sheath 44 preferably is formed by a conventional nylon tape fastener manufactured by the Velcro Corporation and comprising a pile tape 47 and a hook tape 48. Tape 47 is sewn or otherwise suitably secured to the inside of sleeve 16 longitudinally along the neutral flexure axis of the man's arm. Tape 48 is laid over tape 47, and the multiplicity of small hooks on tape 48 tangle with the small piles on tape 47 to bind tape 48 to tape 47 in a manner similar to an adhesive. The portions of cord 30 extending along sleeve 16 between the man's wrist and armpit are confined between tapes 47 and 48 as shown.

When tension is applied to take up both ends of cord 30, tape 48 is pulled away from tape 47 by the movement of cord 30 toward its position shown in FIGURE 2. As a result, the confined portions of cord 30 escape from sheath 44 to assume the tensioned positions shown in FIGURE 2. An alternate form of sheath will be described later on.

Preferably, sheath 46 is of the same construction and is oriented in the same manner as sheath 44. When sheaths 44 and 46 are closed, cord 30 is releasably confined in the position shown in FIGURE 1 where it is restrained under the man's armpits and thus does not impair the man's movement. It is not essential that cord 30 is held by sheaths 44 and 46 in the man's armpits so long as it is in the close proximity of his armpits and is sufficiently slack to allow him to move his arms and body freely, Sheaths 44 and 46 are also advantageous in that they prevent the covered portions of cord 30 from becoming entangled with objects that the man may contact.

In place of tape type fastener sheaths shown in FIGURE 6, suitable zippers 49 may be used as illustrated in FIGURE 9. Each zipper 49 is provided with the usual slide 50 which is moved up to the man's armpit to cover the portions of cord 30 extending along the man's sleeves. At its upper position, slide 50 remains in an unlocked position so that when tension is applied to the ends of cord 30 slide 50 is pushed down to open zipper 49, allowing the confined portions of cord 30 to escape and assume the tensioned positions shown in FIGURE 2.

As shown in FIGURES 1 and 4, cord 31 is guided for movement on garment 10 by a further set of guide rings 56, 57, 58 and 59 which are secured to garment 10 in the same manner as described for rings 32–39. Rings 56 and 57 are secured to the lower end of trouser leg 20, and rings 58 and 59 are secured to the lower end of trouser leg 22. Rings 56–59 are disposed just below the man's shins, with rings 56 and 59 being preferably located on the front of the trouser legs and rings 57 and 58 preferably on the back of the legs.

Still referring to FIGURES 1 and 4, one end of cord 31 extends from snubber 14 and passes through an open-ended sheath 60 on the inside of leg 20 to the crotch of the garment. From the lower end of sheath 60, cord 31 passes through guide 56, around the outside of leg 20, through ring 57, and back up through sheath 60 to the man's crotch.

From the crotch, cord 31 extends down through another open-ended sheath 62 along the inside of trouser leg 22 and passes through ring 58. From here, cord 31 extends around the outside of the left leg, then through ring 59 and back up through sheath 62 to the crotch of the garment. From here, cord 31 passes down through sheath 60, through ring 56, and finally back up to its attachment to cord 28 at snubber 14. It is clear that the two portions of cord 31 extending between snubber 14 and guide ring 56 in FIGURE 1 do not have to extend through sheath 60. Instead, they may extend outside of the sheath and along the man's right-hand leg.

Sheaths 60 and 62 preferably are of the same construction and function in the same manner as sheaths 44 and 46. Sheaths 60 and 62 extend along the neutral flexure axes of the man's legs and releasably hold the intermediate cord portion in the region of his crotch. Thus positioned, coil 31 does not impair movement of the man's legs. Cords 28, 30, and 31 preferably are made from tough nylon or like material.

Since cords 30 and 31 are connected through cord 28 and disconnect assembly 13 to a part that is secured to aircraft 11, they will each be tensioned and taken up at both ends by the motion of the man relative to the aircraft as he is ejected or extracted through the cockpit hatch opening shown in FIGURE 7. The tension exerted on cord 30 opens sheaths 44 and 46 in the manner previously described to progressively release the intermediate cord portions extending along sleeves 16 and 18 as the man leaves the aircraft. When fully released from sheaths 44 and 46 and taken up, these intermediate cord portions extend essentially along straight paths between the man's torso and wrists as shown in FIGURE 2. Continued take-up of cord 30 as the man's movement relative to aircraft 11 continues now applies a pull to his wrists to forcibly draw them toward each other until they are securely lashed together in front of his belly as shown in FIGURE 3. A similar effect occurs by taking up cord 31.

As shown in FIGURE 2, tension applied to both ends of cord 31 progressively opens sheaths 60 and 62 to release the intermediate portions of cord 31 extending along the inside of each trouser leg. When cord 31 is fully released, the tension intermediate portion extends generally horizontally between the man's legs and continued take-up of the cord pulls the man's legs toward each other until they reach the positions shown in FIGURE 3 where they are securely lashed together at the shins.

In essence, the motion imparted to the man by his escape equipment to move him relative to aircraft 11 is employed as the motive force for shortening the effective lengths of cords 30 and 31 on garment 10. In the position shown in FIGURES 3 and 7, the man's limbs are sufficiently restrained to minimize the hazards of limb-flailing in high-velocity windblasts.

By looping cord 30 around the outside of the man's wrists and by looping cord 31 around the outside of his legs, the tension applied to cords 30 and 31 is directly applied to draw the man's limbs together without pulling on garment 10 which may be loose in these regions. Positive lashing of the man's limbs is thus assured irrespective of the looseness of the garment.

To keep the man's trouser leg 20 from creeping up as cord 31 is taken up, leg 20 may be provided with a stirrup 70 which is adapted to fit beneath the instep of the man's boot as shown in FIGURE 1. Trouser leg 22 similarly may be provided with a stirrup 71, although the tendency of trouser leg 22 to ride up when cord 31 is taken up is not as much as leg 20 because cord 31 is guided by rings 56–59 to apply a more horizontally oriented force to the man's left leg.

In place of stirrups 70 and 71, a flexible compressive member 72 may be employed as shown in FIGURE 10. Member 72 comprises a spirally wrapped flexible conduit or similar flexible tubing extending at least between snubber 14 and guide ring 56 and preferably along the neutral flexure axis of the man's leg on the inside of his knee. The portions of cord 31 extending between snubber 14 and the lower end of trouser leg 20 pass through member 72 which is engageable with ring 56 and which resiliently biases trouser leg 20 downwardly to slightly stretch or tension the portion of trouser leg 20 above ring 56. As a result, tendency of trouser leg 20 to ride up when cord 31 is taken up is resiliently opposed by member 72. A flexible compressive conduit 73, which is similar to member 72, may be provided between snubber 14 and guide ring 32 as shown in FIGURE 10.

Referring now to FIGURE 11, disconnect assembly 13, which may be of any suitable form, is shown to comprise a housing 80 which is permanently fixed in the aircraft. The attachment of housing 80 to the aircraft provides the anchorage point to facilitate the take-up of restraint cords 30 and 31 when motion is imparted to the man relative to the aircraft.

Housing 80 is formed with a bore 82 which is adapted to slidably receive a bayonet type insert fitting 84. Fitting 84 is secured to the end of cord 28 remote from snubber 14. When the man enters the aircraft, he inserts fitting 84 into bore 82.

Still referring to FIGURE 11, a latch member 86, which is mounted in housing 80 for sliding motion radially of bore 82, is adapted to extend into an annular, outwardly opening groove 88 on fitting 84 to releasably retain fitting 84 in bore 82 and thus prevent it from being separated from housing 80.

A pin 90, fixed to latch member 86, extends into a slot 92 which is formed on an L-shaped member 94. Member 94 is slidably supported in housing 80 for parallel movement with respect to latch member 86. A helically coiled spring 96 reacting against a wall of housing 80 biases member 94 to the right (as viewed from FIGURE 11) and to a position where the left-hand edge of slot 92 engages pin 90. The bias exerted by spring 96 is thus transmitted through the lost motion transmitting connection provided by member 94 and pin 90 to urge latch member 86 to the right and to a position where the right-hand end of member 86 projects into bore 82 as shown. Displacement of latch member 86 to the right is limited by engagement of member 94 with a cam 98.

When the crewman inserts fitting 84 into bore 82, the conical nose on fitting 84 cams latch member 86 out of the bore, allowing inward displacement of fitting 84 to a position where groove 88 aligns with the latch member. When this position is reached, the bias exerted by spring 96 urges latch member 86 into groove 88 to thereby releasably latch fitting 84 against displacement relative to housing 80. Cord 28 is thus secured to housing 80 so that it will be tensioned when relative motion is imparted to the man. A helically coiled spring 99 is partially compressed by engagement of the nose on fitting 84 to resiliently urge the upwardly facing side wall of groove 88 into engagement with latch member 86. Any play between latch member 86 and fitting 84 is thus taken up.

To facilitate a normal egress from the cockpit of aircraft 11, the man grips a handle portion 100 of latch member 86 and displaces member 86 to the left against the bias of spring 96 until the forward end of latch member 86 clears the periphery of fitting 84. Fitting 84 is thus released so that a slight pull aided by the bias of spring 99 removes it from bore 82. The limb restraint equipment on garment 10 is thus disconnected from the aircraft allowing the man to climb out of the cockpit after he has landed the aircraft.

With reference to FIGURES 8 and 11, a secondary control handle 102, which is pulled by the crewman when a crash-ditch mode of escape is desired, is connected to a suitable motion transmitting cable 104 which extends through an open ended slot 106 (see FIGURE 12). Slot 106 is formed between two parallel arms 108 and 109 on cam 98. The end of cable 104 at cam 98 terminates in a ball 110 which seats against arms 108 and 109.

When a pull signal is transmitted through cable 104, cam 98, which is pivotally mounted in housing 80, is rocked in a counterclockwise direction as viewed from FIGURE 11 to urge member 94 to the left against the bias exerted by spring 96. When member 94 is displaced sufficiently far, the right-hand edge of slot 92 engages pin 90 to shift latch member 86 to the left to release fitting 84.

Cam 98 is provided with a further camming surface 112 which compresses spring 99 as cam 98 is rotated in a counterclockwise direction. Spring 99 will be fully compressed by the time the right-hand edge of slot 92 engages pin 90. Thus when release motion is imparted to latch member 86, the spring 99 is compressed sufficiently to forcibly eject fitting 84 from bore 82. The lost motion connection provided by pin 90 and slot 92 thus enables sufficient energy to be stored in spring 99 to forcibly eject fitting 84 from housing 80.

Continued rotation of cam 98 beyond the position where fitting 84 is released causes ball 110 to slide off arms 108 and 109, thus releasing cable 104 from disconnect assembly 13.

It will be appreciated that the secondary control handle 102 is conventionally connected to release the man from all parts in the vehicle, such as his restraint belts, so that he is free to climb out over the side of the aircraft cockpit. In addition to a crash-ditch escape, the crewman pulls handle 102 if he wants to make an over-the-side bailout without using his escape equipment.

As shown in FIGURE 8, cord 28 is connected to fitting 84 by a break or shear link 116. When the man's wrists and legs are pulled together during his escape from the aircraft, sufficient tension is applied through cord 28 to cause link 116 to fail. The man is thus freed from any restraining attachment to the aircraft. At this stage, snubber 14 becomes operative to prevent cords 30 and 31, which are now shortened and tensioned, from becoming slack.

Snubber 14 may be of any suitable ratchet type construction which allows motion of cord assembly 12 only in a limb restraining direction. In FIGURE 7, snubber 14 is shown to comprise a housing 120 in which a ratchet arm 122 is pivotally mounted. A light spring 124 biases arm 122 in a clockwise direction as viewed from FIGURE 7. Arm 122 and an internal housing surface are respectively provided with opposed, coacting sets of teeth 126 and 128 for engaging cord assembly 12 in a manner to be described shortly.

Cord 28 passes freely through opposite sides of housing 120 as shown. Within housing 120, cord 28 is guided and confined for longitudinal movement between teeth 126 and 128.

As the man moves out of the aircraft, relative motion occurs between cord assembly 12 and snubber 14 which, as previously mentioned, is carried on garment 10. Cord 28 thus rides freely over teeth 126 to urge arm 122 in a counterclockwise direction as viewed from FIGURE 7. The edges of teeth 126 and 128 face in this direction so that they do not prevent relative motion of cord assembly 12 in the direction for restraining the man's limbs.

When link 116 fails, the relative motion of cord 28 tends to reverse to slacken the restraint cords 30 and 31 which at this stage have been taken up to lash the man's arms and legs together. Teeth 126, however, bite into cord 28 or cords 30 and 31, if cord assembly 12 has been taken up sufficiently to relatively displace cords 30 and 31 through housing 120, causing arm 122 to rock back in a clockwise direction to a position where the cord is confined between and securely gripped by teeth 126 and 128. Engagement of teeth 126 and 128 with the cord portion in housing 120 securely anchors cord assembly 12 to prevent cords 30 and 31 from becoming slack and thus prematurely releasing the man's restrained limbs.

A predetermined time after the man is removed from the aircraft, his lashed wrists and legs are automatically released by cutting the portion of cord assembly 12 extending between teeth 126 and 128 and his lashed limbs. This may be accomplished by a mechanically-initiated reefing line cutter 130 (see FIGURE 8) which may be of any suitable, conventional form such as the series SO6 manufactured by Space Ordnance Systems, Inc. Such a reefing line cutter has a firing mechanism (not shown) which, when actuated by displacement of an arming pin 132, is spring driven into a standard, unshown percussion primer. After a time delay of about three seconds, the unshown time-delay cartridge of cutter 130 ignites to generate gas pressure for forcibly displacing a cutting blade 134 to a position where it severs the portion of cord assembly 12 at a region between teeth 126 and 128 and the man's restrained limbs. As a result, the man's arms and legs are released for unimpaired motion.

To arm cutter 130, pin 132 may be connected to arm 122 by a suitable motion transmitting linkage 136 as shown in FIGURE 7. When initial movement is imparted to the man to extract or eject him from the aircraft, relative motion is imparted to cord 28 which begins to tension and cause arm 122 to pivot in a counterclockwise direction. This motion is transmitted through linkage 136 to pull pin 132 and thus arm cutter 130. After a short time delay of about three seconds, the cartridge of cutter 130 fires to sever cord assembly 12.

The cartridge time delay may vary depending upon the type of escape apparatus employed, the type of aircraft or vehicle carrying the man, and other conditions. In essence, this time delay is selected to be sufficiently long to assure that the man is no longer in danger of being injured by windblast when cord assembly 12 is cut.

When it is expected that the man will be subjected to a windblast of exceptionally high velocity, it is desirable to restrain both his arms and his legs. If the expected windblast is not so severe, however, it may only be necessary to restrain his legs.

An alternate arrangement for arming cutter 130 is shown in FIGURE 8A to comprise a motion transmitting cable assembly 140 which connects pin 132 to a primary escape control handle 142. Handle 142 is operatively connected to a rocket-powered escape apparatus 144 which is operable to forcibly remove the man from the cockpit of aircraft 11. A suitable shear link and manual disconnect assembly 141 of the type previously described may be incorporated into cable assembly 140.

Apparatus 144 may be of any suitable, known construction such as the extraction type disclosed in the pending, commonly owned application Ser. No. 605,121 filed Dec. 12, 1966. This extraction type escape apparatus comprises a rocket (see FIGURE 7) which is launched from the aircraft and which is connected by a towline 148 to pull the man out of the cockpit. Alternatively, conventional ejection type rocket escape equipment may be used. When the man pulls handle 142 to eject or extract himself from aircraft 11, pin 132 is pulled to arm cutter 130 which will fire after the necessary time delay to release the man's arms and legs as previously described.

It is clear from the foregoing description that rocket-powered extraction or ejection is initiated when the man pulls handle 142. The resulting rocket thrust is transmitted to forcibly remove the man through the cockpit hatch opening, thus imparting motion of the man relative to the aircraft to tension cord assembly 12. As the man begins to pass through the hatch opening, restraint cords 30 and 31 are taken up sufficiently to lock his wrists and legs together in the manner previously described. Thus, when he is clear of the aircraft as shown in FIGURE 7, his limbs are securely restrained.

After a delay of about three seconds, cutter 130, which was armed either by the motion of arm 122 or by pulling control handle 142, fires to sever cord assembly 12 at a region between the cord lock at teeth 126 and 128 and the man's limbs. The man's legs and arms are thus released for unimpaired motion to make a safe recovery by parachute.

A manual back-up to cutter 130 preferably is provided for and is shown in FIGURE 8 to comprise a rod-shaped handle 150 which is connected to arm 122 and which projects through an opening in housing 120 into the region of the man's hands when they are bound together by cord 30. If cutter 130 malfunctions or if the man simply decides that limb restraint is not desired, he pulls handle 150 to impart counterclockwise rotation to arm 122. This motion of arm 122 releases restraint cords 30 and 31 to free the man's arms and legs.

A modified restraint cord assembly 160 is shown in FIGURE 13 to comprise restraint cords 162, 163, and 164 respectively for the man's right-hand arm, his left-hand arm and his legs. To the extent that this embodiment is the same as that shown in FIGURE 1, like reference numerals have been applied to designate like parts.

Cords 162–164 are shown in FIGURE 13 to be spliced or otherwise suitably secured to cord 28. In this embodiment, rings 32, 33, 38, 39, 56, and 59 are employed.

Cord 162 extends upwardly through guide ring 32 and along the right-hand side of the man's torso to his right-hand armpit. From here, cord 162 passes downwardly through sheath 44 and is secured at its free end to ring 33.

Cord 163 extends upwardly through ring 32, passes across the front of the man in the region of his waist, extends through ring 39, and passes upwardly along the side of the man's torso to his left-hand armpit. From here, cord 163 passes downwardly through sheath 46 and is secured at its free end to ring 38.

Cord 164 passes downwardly through sheath 60, loops through ring 56, and extends back up through sheath 60 to the man's crotch. From this region, cord 164 extends downwardly through sheath 62 and is secured at its free end to ring 59.

Preferably, rings 33, 39, 56, and 59 are each secured to reinforcing bands 166 which are made of fabric and which are suitably secured to garment 10 around sleeves 16 and 18 and trouser legs 20 and 22.

The initial tension applied to cord 162 as the man is moved upwardly relative to aircraft 11, applies pressure to open sheath 44. The confined portion of cord 162 extending along sleeve 16 is thus released and pulled taut to pull the man's right-hand arm toward the position shown in FIGURE 14.

Cord 163, which is taken up simultaneously with cord 162, is initially tensioned to open sheath 46. The intermediate portion of cord 163 extending along sleeve 18 is thus released and pulled taut to pull the man's left-hand arm to the position shown in FIGURE 14.

Similarly, the initial tension applied to cord 164 opens sheaths 60 and 62, and when cord 164 is thereafter pulled taut concomitantly with cords 162 and 163, it pulls the man's legs together as shown in FIGURE 14.

After link 116 fails, snubber 14 engages cords 162–164 to hold them in their taut, limb restraining positions until cutter 130 is fired as previously described.

Instead of anchoring an end of cord assembly 12 to a part in the aircraft in order to tension the limb restraint cords when the man is forcibly moved upwardly relative to aircraft 11, a ballistically operated windlass 170 may be employed as shown in FIGURE 15.

Windlass 170 is mounted on garment 10 in place of snubber 14 and may be of any suitable construction such as the linear type illustrated in FIGURE 15. This form of windlass is shown to comprise a pair of parallel pulley shafts 172 and 174 which are supported in a housing 176 for lateral movement away from each other. Pulley sets 178 and 180 are respectively mounted on shafts 172 and 174. The ends of restraint cords 30 and 31 may be joined together and are trained alternately around the pulleys in sets 178 and 180 so that portions of the cords extend between shafts 172 and 174. Thus when shafts 172 and 174 are laterally separated, both ends of each of the cords are effectively payed or reeled in. This windlass construction is generally conventional. In effect, windlass 170 is operable to make the unreeled lengths of cords 30 and 31 shorter by taking up or reeling in both ends of each cord.

Still referring to FIGURE 15, windlass 170 may be powered by any suitable means such as a ballistically operated motor assembly 182. Assembly 182 comprises a pair of axially opposed pistons 184 and 186 which are slidably received in a cylinder 188 and which are connected by piston rods 190 and 192 to shafts 172 and 174 respectively. By introducing gas under pressure into cylinder 188, pistons 184 and 186 are forced axially apart to rapidly drive shafts 172 and 174 laterally away from each other, thereby paying in the ends of cords 30 and 31 which are anchored to either pulley set of the windlass.

To provide gas pressure for operating motor assembly 182, a firing mechanism 194 is actuatable to ignite a conventional primer and cartridge assembly 196. Firing mechanism 194 may be of any suitable conventional construction and is shown to be connected to the primary escape control handle 142 by a suitable motion transmitting cable assembly 198. Disconnect pin 132 of the reefing line cutter 130 is also connected to handle 142 by cable assembly 198.

When handle 142 is pulled by the crewman, escape apparatus 144 is actuated to eject or extract the man from the aircraft cockpit as previously described. Simultaneously, firing mechanism 194 is actuated when handle 142 is pulled to ignite cartridge assembly 196. The resulting gases which are generated by cartridge ignition flow into cylinder 188 to force pistons 184 and 186 rapidly, axially apart. This motion is applied through piston rods 190 and 192 to rapidly drive shafts 172 and 174 laterally apart for paying in the ends of restraint cords 30 and 31.

A suitable manual disconnect assembly 200 is provided in cable assembly 198 to enable the crewman to connect and disconnect the limb restraint equipment carried on his garment with respect to the apparatus in the aircraft. Since the disconnect pins for firing mechanism 194 and cutter 130 usually are pulled free of their respective housings, a shear link such as that shown in FIGURE 8 is normally not required but may be provided if desired.

Shafts 172 and 174 are retained in their laterally spaced apart positions by gas pressure in cylinder 188 as separation of the man from aircraft 11 is effected. After a short delay of about three seconds, cutter 130, which was armed by pulling handle 142, fires to sever cords 30 and 31 and thus release the man's arms and legs for unimpaired motion in the manner previously described.

It will be appreciated that windlass 170 may be used in conjunction with either the embodiment shown in FIGURE 1 or the embodiment shown in FIGURE 13.

FIGURE 16 illustrates a modified form of snubber which contains a pair of side-by-side, rotatably mounted reels 200 and 202. Cord 28, instead of being secured directly to the limb restraint cords, is trained around and anchored to reel 200. The limb restraint cords 30 and 31 pass through the housing for cutter 130, over teeth 126 on arm 122 and are trained around and anchored to reel 202. Reels 200 and 202 are operatively interconnected by any suitable means such as a gear train indicated at 204. Rotation of reel 200 is thus imparted to rotate reel 202 through the drive connection provided by gear train 204.

From the foregoing, it is clear that when upward motion is imparted to the man relative to the vehicle, cord 28 which is anchored to the aircraft through the connection provided by link 116 and disconnect assembly 13 is payed out to rotate reel 200. Rotation is thus imparted to reel 202 to pay or reel in the ends of each of the restraint cords 30 and 31. Operation of the snubber shown in FIGURE 16 is otherwise the same as that described for snubber 14.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An assembly for restraining a man's limbs upon being forcibly removed from a vehicle by a power operated escape system, said assembly comprising a garment adapted to be worn by the man, and means cooperating with said garment for forcibly drawing together and binding at least one pair of the man's limbs, said means comprising force transmitting cord means extending along said garment and in the region of said pair of limbs, means for forcibly tensioning and shortening the effective length of said cord means extending along said garment and for checking the relaxation of the tensioned cord means, and means on said garment for guiding and restricting movement of said cord means to transmit the force applied by said tensioning and shortening means for pulling said pair of limbs toward each other, said means for checking relaxation of the tensioned cord means comprising a device carried by said garment whereby relaxation of the tensioned cord means is checked independently of a seat occupied by the man in the vehicle before his removal therefrom.

2. An assembly for restraining a man's limbs upon being forcibly removed from a vehicle by a power-operated escape system, said assembly comprising a garment adapted to be worn by the man, and means cooperating with said garment for forcibly drawing together and binding at least one pair of the man's limbs said means comprising force transmitting cord means extending along said garment and in the region of said pair of limbs, means for forcibly tensioning and shortening the effective length of said cord means extending along said garment for checking relaxation of the tensioned cord means, and means on said garment for guiding and restricting movement of said cord means to transmit the force applied by said tensioning and shortening means for pulling said pair of limbs toward each other, said tensioning and shortening means comprising ballistically operated means carried on said garment and being operative to pay in said cord means.

3. An assembly for restraining at least one pair of a man's limbs upon being forcibly separated from a seat in a vehicle and removed from the vehicle by a power-operated escape system, said assembly comprising normally slack, elongated flexible means extending along said garment in the region of said limbs, means for forcibly tensioning said flexible means to shorten the effective length thereof extending along said garment, and guide means carried by said garment, said flexible means being positioned and guided by said guide means to transmit the tension applied thereto by said tensioning means in a direction for binding said limbs together to restrain them against flailing when the man is separated from said seat and removed from the vehicle by operation of said escape system.

4. The assembly defined in claim 3 wherein said flexible means comprises cord means, and wherein said tensioning means comprises a device carried on said garment for checking relaxation of said cord means when said cord means is tensioned.

5. An assembly for restraining at least a man's legs upon being forcibly removed from the vehicle by a power-operated escape system, said assembly comprising a garment adapted to be worn by the man, normally slack, elongated flexible means extending along said garment in the region of the man's legs, means for forcibly tensioning said flexible means to shorten the effective length thereof extending along said garment, and guide means carried by said garment, said flexible means being positioned and guided by said guide means to transmit the tension applied thereto by said tensioning means in a direction for drawing together and binding the man's legs in a region between his knees and ankles to restrain the man's legs against flailing upon his removal from said vehicle by operation of said escape system.

6. The combination defined in claim 5 wherein said tensioning and shortening means comprises a device carried on said garment independently of a seat occupied by the man when in the vehicle to restrain the man's legs against flailing upon separation of the man from said seat.

7. The assembly defined in claim 1 wherein said device comprises a snubber.

8. The assembly defined in claim 1 wherein said garment is formed with trouser legs and wherein said cord means comprises at least one cord having both of its ends terminating at said device to be taken up by said shortening means, said cord having intermediate guided portions looped around the outside of said trouser legs at regions below the man's knees, the force exerted by said tensioning means being applied through said intermediate looped portions to draw the man's legs together.

9. The assembly defined in claim 8 comprising elements disposed lengthwise along the inside of said trouser legs and releasably retaining the intermediate cord sections extending between said looped portions in positions where they extend along the inside of said trouser legs between the man's crotch and said leg regions when said cord is in an untensioned condition, said elements being responsive to the tension applied to said cord to release said cord sections and allow them to extend along a straight path between said looped portions when the slack is taken up.

10. The assembly defined in claim 1 wherein said garment is formed with sleeves and wherein said cord means comprises at least one cord having both of its ends terminating at said device to be taken up by said shortening means, said cord further having intermediate guided portions looped around the outside of said sleeves at the man's wrists, the force exerted by said shortening means to the ends of said cords being applied through said intermediate looped portions to pull the man's arms towards each other.

11. The assembly defined in claim 10 comprising elements disposed lengthwise along the inside of said sleeves and releasably retaining intermediate cord sections extending from said looped portions in positions where they are disposed along said sleeve between each armpit and wrist when said cord is in an untensioned condition, said elements being responsive to the tension applied to said cord to release said cord sections and allow them to extend along a path determined by said guide means.

12. The assembly defined in claim 1 wherein said garment is formed with trouser legs, wherein said guide means comprises a ring-like member disposed on each trouser leg, and wherein said cord means comprises at least one cord having one end extending to said device to be taken up by said shortening means, said cord extending from said device downwardly along one trouser leg, slidably through the ring-like member on one trouser leg and having its opposite end secured to the ring-like member on the other trouser leg, the tension applied by said shortening means at said one end of said cord being effective to pull said trouser legs together, said assembly further comprising means for retaining the intermediate portion of said cord which is between said ring-like members in a position where it extends from said one ring-like member upwardly along said one trouser leg to the man's crotch and downwardly along said other trouser leg to said other ring-like member when said cord is in an untensioned condition, said retainer means being operative to release said intermediate cord portion when tension is applied to said one end.

13. The assembly defined in claim 1 wherein said garment is formed with sleeves, wherein said guide means comprises a ring-like member on each sleeve at the man's wrist, and wherein said cord means comprises one cord for each arm, said cord having one end extending to said device to be taken up by said shortening means, and the opposite end of said cord being secured to ring-like member, said assembly further comprising means for retaining the intermediate cord portion extending from said ring-like member in a position where it is disposed along the inside of the garment sleeve and extends from the man's wrist to his armpit when said cord is untensioned, said retainer means being operative to release said intermediate portion when said cord is tensioned to enable said shortening means to pull on the sleeve through the connection provided by said cord and said ring-like member.

14. The assembly defined in claim 2 wherein said ballistically operated means is actuated when the man selectively actuates a rocket-powered escape apparatus for effecting his forced removal from the vehicle.

15. An assembly for restraining a man's limbs against flailing when he is forcibly removed from a vehicle by a rocket powered escape apparatus, said assembly comprising a garment adapted to be worn by the man, normally slack cord means carried on the garment in the region of his limbs, manually operated disconnect means for releasably securing said cord means to a part fixed in said vehicle and being effective to tension and take in the effective length of the cord means extending along said garment when the man is moved relative to said vehicle by operation of said escape apparatus, means carried on said garment for guiding the relative movement of said cord means when tensioned by movement of the man away from said part for pulling the man's limbs together, and means carried on said garment for checking relaxation of the tensioned cord means when the man leaves the vehicle to keep the limbs restrained during the period when the man is subjected to the windblast.

References Cited

UNITED STATES PATENTS

| | | | |
|---|---|---|---|
| 2,664,083 | 12/1953 | Heymans | 128—134 |
| 2,848,993 | 8/1958 | Terrell | 128—134 |
| 3,074,669 | 1/1963 | Bohlin | 244—122 |
| 3,324,851 | 6/1967 | Posner | 128—134 |
| 3,411,500 | 11/1968 | Gatts | 128—1.01 |

ADELE M. EAGER, Primary Examiner

U.S. Cl. X.R.

2—2.1; 128—1.01, 68